United States Patent
Yang et al.

(10) Patent No.: US 10,222,884 B2
(45) Date of Patent: Mar. 5, 2019

(54) METHOD AND DEVICE FOR DETECTING DEFECTS IN A PRESSING TEST OF A TOUCH SCREEN

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Gang Yang, Beijing (CN); Yong Song, Beijing (CN); Jun Long, Beijing (CN); Xijun An, Beijing (CN); Hongkun Zhang, Beijing (CN); Ziwang Liu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 274 days.

(21) Appl. No.: 15/159,214

(22) Filed: May 19, 2016

(65) Prior Publication Data

US 2017/0011504 A1    Jan. 12, 2017

(30) Foreign Application Priority Data

Jul. 6, 2015    (CN) .......................... 2015 1 0390573

(51) Int. Cl.
  *G06K 9/00*    (2006.01)
  *G06F 3/041*    (2006.01)
  *G06T 7/00*    (2017.01)

(52) U.S. Cl.
  CPC ............. *G06F 3/041* (2013.01); *G06T 7/001* (2013.01); *G02F 2203/69* (2013.01); *G06T 2207/30121* (2013.01)

(58) Field of Classification Search
  None
  See application file for complete search history.

(56) References Cited

U.S. PATENT DOCUMENTS 7,024,338 B2 *   4/2006   Chung ............. G05B 19/41875
                                                    324/754.3
7,394,534 B1 *   7/2008   Huet .................. G01N 21/8851
                                                    356/237.4
(Continued)

FOREIGN PATENT DOCUMENTS

CN    101180549 A    5/2008
CN    102879673 A    1/2013
(Continued)

OTHER PUBLICATIONS

Office Action dated Oct. 9, 2017 issued in corresponding in Chinese Application No. 201510390573.4.

*Primary Examiner* — Sumati Lefkowitz
*Assistant Examiner* — David Perlman
(74) *Attorney, Agent, or Firm* — Nath, Goldberg & Meyer; Joshua B. Goldberg; Daniel Bissing

(57) ABSTRACT

The present invention provides a method and a device for detecting defects in a pressing test of a touch screen. The method for detecting defects in a pressing test of a touch screen includes: Step S1: acquiring, after each test point of the touch screen is tested, an image of a test region in which the test point is located, when performing the pressing test; Step S2: identifying a quantity of abnormal points in the acquired image; and Step S3: comparing the identified quantity of abnormal points with a quantity of abnormal points allowed in the pressing test, and determining that the touch screen has defects if the identified quantity of abnormal points exceeds the quantity of abnormal points allowed in the pressing test. The above method for detecting defects (Continued)

can check instantly and accurately whether defects arise on the touch screen during the pressing test.

14 Claims, 2 Drawing Sheets

(56) References Cited

U.S. PATENT DOCUMENTS

| | | | |
|---|---|---|---|
| 9,103,800 B2* | 8/2015 | Bills | G01N 21/21 |
| 2005/0232476 A1* | 10/2005 | Hayakawa | G09G 3/006 |
| | | | 382/141 |
| 2009/0136118 A1 | 5/2009 | Ichikawa | |
| 2012/0105092 A1* | 5/2012 | Abiru | G01M 99/008 |
| | | | 324/760.01 |

FOREIGN PATENT DOCUMENTS

| | | |
|---|---|---|
| CN | 103257465 A | 8/2013 |
| CN | 103488364 A | 1/2014 |
| CN | 103777380 A | 5/2014 |
| JP | 2004-117241 A | 4/2004 |

* cited by examiner

METHOD AND DEVICE FOR DETECTING DEFECTS IN A PRESSING TEST OF A TOUCH SCREEN

FIELD OF THE INVENTION

The present invention relates to the field of display technology, and in particular relates to a method for detecting defects in a pressing test of a touch screen and a device for detecting defects in a pressing test of a touch screen.

BACKGROUND OF THE INVENTION

In the prior art, a touch screen generally includes a display screen and a touch component, wherein the display screen is used for implementing a display function and is generally a thin film transistor liquid crystal display (hereinafter referred to as TFT LCD for short), and the touch component is used for implementing a touch function.

Upon completing the preparation of the touch screen, a pressing test needs to be performed on the touch screen, so as to detect the compressive property and durability of the display screen and the touch component. The pressing test includes a clicking test, a scribing test and a soft pressing test. The clicking test means that, in a state of powering on, each of the test points on the touch screen are pressed separately several times (for example, each test point is pressed 100 thousand times) by using a pressing head, which has a diameter of 5 mm or other size, with a certain force (for example, 2.5 N), and then it is checked whether the appearance and functions of the touch screen are normal. The scribing test means that, in the state of powering on, scribing at each of the test points on the touch screen are performed several times (for example, scribing at each test point 200 thousand times) separately by using a pressing head, which has a diameter of 5 mm or other size, with a certain force (for example, 2.5 N), and then it is checked whether the appearance and functions of the touch screen are normal. The soft pressing test means that, in the state of powering on, a front surface (i.e., a display surface) of the touch screen is positioned facing down, the touch screen maintains perpendicularity to the pressing head, and the touch screen is pushed several times with a certain force (for example, pushing 2000 times with a force of 300 N), and then it is checked whether the appearance, functions and assembling of the touch screen are normal.

After the clicking test, the scribing test or the soft pressing test is performed a large number of times on the touch screen, a surface of a spacer inside the touch screen may be easily damaged, and some particles may fall off the surface of the spacer and fall into the liquid crystal layer, resulting in an abnormal transmission of light occurring at position(s) where the particles fall, thereby producing bright spots, i.e. so-called Zara defects. Thus, after the pressing test is complete, the quality of the touch screen needs to be tested. Specifically, if the number of bright spots is less than a predetermined value, then the touch screen is determined to be qualified; if the number of bright spots exceeds the predetermined value, then the touch screen is determined to be unqualified.

In the prior art, Zara defects presented in the display screen is usually detected visually by a person after the pressing test is complete. However, there are two technical problems as follows in this detection method.

First, criteria for the visual detection vary from person to person, which will easily bring about false detection, missed detection, over detection or the like, resulting in low accuracy of the detection.

Second, the detection is performed after the pressing test is completed, which causes poor instantaneousness of the detection. That is, it is impossible to instantly learn how many times of pressing, scribing or pushing is performed before the number of bright spots exceeds the predetermined value.

Furthermore, in practice, qualification criteria are different for different uses of touch screens, and thus in a case of using the above detection method, it is impossible to determine whether the touch screen meets any other requirement of less strict criteria at the time when the touch screen does not meet the requirement of more strict criteria.

SUMMARY OF THE INVENTION

The present invention intends to address at least one technical problem in the prior art, and proposes a method and a device for detecting defects in a pressing test of a touch screen, which can check instantly and accurately whether defects occur in the touch screen during the pressing test.

To achieve the object of the present invention, there is provided a method for detecting defects in a pressing test of a touch screen, which includes:

Step S1: acquiring, after each test point of the touch screen is tested, an image of a test region in which the test point is located, when performing the pressing test;

Step S2: identifying a quantity of abnormal points in the acquired image; and

Step S3: comparing the identified quantity of abnormal points with a quantity of abnormal points allowed in the pressing test, and determining that the touch screen has defects if the identified quantity of abnormal points exceeds the quantity of abnormal points allowed in the pressing test.

Optionally, Step S3 further comprises: determining a defect level of the touch screen based on a value by which the identified quantity of abnormal points exceeds the quantity of abnormal points allowed in the pressing test.

Optionally, Step S2 further comprises: identifying a size of each abnormal point in the acquired image, and classifying the abnormal points into multiple levels based on the sizes of the abnormal points; and Step S3 further comprises: comparing a quantity of abnormal points of each level with a quantity of abnormal points of the same level allowed in the pressing test, and determining that the touch screen has defects if a quantity of abnormal points of any level exceeds the quantity of abnormal points of the same level allowed in the pressing test.

Optionally, Step S3 further comprises: comprehensively determining a defect level of the touch screen based on respective values by which the quantity of abnormal points of each level exceeds the quantity of abnormal points of the same level allowed in the pressing test.

Optionally, the method further comprises, after Step S3, giving a warning after determining that the touch screen has defects.

Optionally, the method further comprises, after Step S3, giving a warning after determining that the touch screen has defects, and notifying the determined defect level of the touch screen.

Optionally, Step S1 further comprises: indicating, when acquiring the image of the test region in which the test point is located, how many times the test point has been tested.

Optionally, in Step S2, the quantity of abnormal points in the image acquired in Step S1 is identified by comparing the image acquired in Step S1 with a standard image, the standard image being an image of the test region in which the test point is located without any abnormal point.

Optionally, the method further comprises, after Step S3, recording, after determining that the touch screen has detects, how many times the test point has been tested.

As another technical solution, the present invention further provides a device for detecting defects in a pressing test of a touch screen, which includes:

an image acquisition unit, for acquiring, after each test point of the touch screen is tested, an image of a test region in which the test point is located, when performing the pressing test;

an image identification unit, for identifying a quantity of abnormal points in the acquired image; and a defect determination unit, for comparing the identified quantity of abnormal points with a quantity of abnormal points allowed in the pressing test, and determining that the touch screen has defects if the identified quantity of abnormal points exceeds the quantity of abnormal points allowed in the pressing test.

Optionally, the defect determination unit further determines a defect level of the touch screen based on a value by which the identified quantity of abnormal points exceeds the quantity of abnormal points allowed in the pressing test.

Optionally, the image identification unit further identifies a size of each abnormal point in the acquired image, and classifying the abnormal points into multiple levels based on the sizes of the abnormal points; and the defect determination unit further compares a quantity of abnormal points of each level with a quantity of abnormal points of the same level allowed in the pressing test, and determining that the touch screen has defects if a quantity of abnormal points of any level exceeds the quantity of abnormal points of the same level allowed in the pressing test.

Optionally, the defect determination unit further determines comprehensively a defect level of the touch screen based on respective values by which the quantity of abnormal points of each level exceeds the quantity of abnormal points of the same level allowed in the pressing test.

Optionally, the device further comprises a warning unit, which is used for giving a warning after the detect determination unit determines that the touch screen has defects.

Optionally, the device further comprises a warning unit, which is used for giving a warning after the defect determination unit determines that the touch screen has defects, and notifying the determined defect level of the touch screen.

Optionally, the image acquisition unit further indicates how many times the test point has been tested when acquiring the image of the test region in which the test point is located.

Optionally, the image identification unit identifies, by comparing the image acquired by the image acquisition unit with a standard image, the quantity of abnormal points in the image acquired by the image acquisition unit, the standard image being an image of the test region in which the test point is located without any abnormal point.

Optionally, the device further comprises a recording unit, which is used for recording how many times the test point has been tested after the defect determination unit determines that the touch screen has detects.

The present invention has the beneficial effects as follows.

The method and the device for detecting defects in a pressing test of a touch screen provided by the present invention can realize automatic detection of defects in the touch screen during the pressing test. Compared to the prior art, it avoids detection errors occurring in visual detection as well as the inconsistency of detection criteria, thereby increasing the accuracy of the detection and preventing from false detection, missed detection and over detection. Meanwhile, in the present invention, the detection can be performed automatically during the pressing test of the touch screen, which can improve the instantaneousness of the detection, and in addition, when it is determined in time that the touch screen has defects, the number of times the touch screen has been tested can be recorded, thereby making it possible to determine the compressive property and durability of the touch screen timely and conveniently.

BRIEF DESCRIPTION OF THE DRAWINGS

The accompanying drawings, which constitute a part of the specification, are provided for further understanding of the present invention, and for explaining the present invention along with the following specific implementations, but not intended to limit the present invention, in which.

DETAILED DESCRIPTION OF THE EMBODIMENTS

The specific implementations of the present invention will be described in detail below in conjunction with the drawings. It should be understood that specific implementations to be described herein are merely used for illustrating and interpreting the present invention and not for limiting the present invention.

Figure 1:
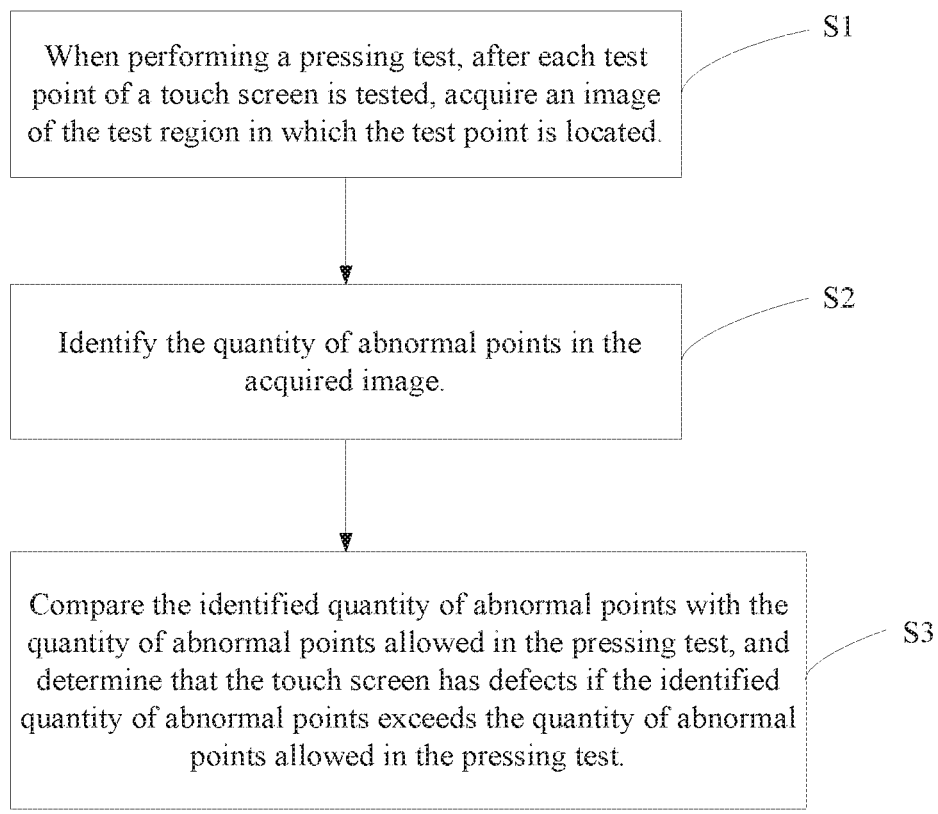
FIG. 1 is a flow chart of a method for detecting defects in a pressing test of a touch screen provided in an implementation of the present invention.

The present invention provides an implementation of a method for detecting detects in a pressing test of a touch screen, the pressing test including a clicking test, a scribing test and a soft pressing test. FIG. 1 is a flow chart of the method for detecting defects in a pressing test of a touch screen provided in an implementation of the present invention. As shown in FIG. 1, in the present implementation, the method for detecting defects in a pressing test of a touch screen includes the following Steps S1-S3.

In Step S1, after each test point of the touch screen is tested, an image of a test region in which the test point is located, is acquired when performing the pressing test;

When performing the pressing test, multiple test points are generally selected for the test. For example, when performing the clicking test, a total of 5 points at four corners and the center of the touch screen are selected to be pressed; as another example, multiple test points located at the same row on the touch screen are selected to be pressed. Here, the "test region in which the test point is located" refers to a region in which an abnormal point (such as a bright spot) may arise merely due to the pressing test being performed on the test point. It may be understood that the test region in which the test point is located may be manually determined before performing the pressing test. Specifically, the test region in which the test point is located may be determined by an experiment. Preferably, the test region in which the test point is located satisfies such requirement that the abnormal points, which arise when the pressing test is performed on a test point within the test region, all appear inside the test region rather than outside the test region.

In Step S1, the number of times the test point has been tested may be indicated when acquiring the image of the test region in which the test point is located.

It needs to be noted that in the present invention, a test performed on each test point may be a pressing (corresponding to the clicking test), a scribing (corresponding to the scribing test), or a pushing (corresponding to the soft pressing test).

In Step S2, a quantity of abnormal points in the acquired image is identified.

Specifically, in Step S2, the quantity of abnormal points in the image acquired in Step S1 may be identified by comparing the image acquired in Step S1 with a standard image, wherein the standard image is an image of the test region in which the test point is located without any abnormal point. Because image comparison techniques belong to the prior art, a description thereof is omitted herein.

Since the number of times the test point has been tested is indicated in Step S1 when acquiring the image of the test region in which the test point is located, in Step S2, after identifying the abnormal points in the image of the test region in which the test point is located, the quantity of the abnormal points may correspond to the number of times the test point has been tested.

In Step S3, the identified quantity of abnormal points is compared with a quantity of abnormal points allowed in the pressing test, and it is determined that the touch screen has defects if the identified quantity of abnormal points exceeds the quantity of abnormal points allowed in the pressing test.

Specifically, if the quantity of abnormal points identified in Step S2 exceeds the quantity of abnormal points allowed in the pressing test, then the touch screen is unqualified, in which case it is determined that the touch screen has defects; if the quantity of abnormal points identified in Step S2 does not exceed the quantity of abnormal points allowed in the pressing test, then the touch screen is qualified.

In the present implementation, the qualification of the touch screen can be automatically done during the pressing test by the steps of image acquisition, image identification and abnormal point comparison, which leads to a better instantaneousness. Moreover, compared to the prior art, it avoids detection errors occurring in visual detection as well as the inconsistency of detection criteria, thereby increasing the accuracy of the detection and preventing from false detection, missed detection and over detection.

During the pressing test, because the number of times the test point has been tested is indicated when acquiring the image of the test region in which the test point is located, such that the number of times the test point has been tested so far may be recorded after it is determined that the touch screen has defects. Therefore, if the quantity of abnormal points identified in the image of the test region in which a test point is located exceeds the quantity of abnormal points allowed in the pressing test, then it is determined in Step S3 that the touch screen has defects, and the number of times the test point has been tested can also be determined. Compared to the prior art, the instantaneousness of the defect detection is improved in the present invention, such that one can not only detect whether the touch screen meets the requirement of particular criteria for the pressing test, but also determine quickly, in the case that the touch screen does not meet the requirement of the particular criteria for the pressing test, which one of less strict criteria for the pressing test the touch screen can meet. This makes it possible to determine the actual compressive property and durability of the touch screen, thereby making it possible to apply a touch screen, which is determined as having defects based on certain criteria for the pressing test, to a field corresponding to other less-strict criteria for the pressing test that the touch screen can satisfy.

Specifically, in the present implementation, a warning may be given after determining that the touch screen has defects, so as to inform a person of whether the touch screen has defects or not in time.

In a preferable embodiment of the present implementation, in Step S3, a defect level of the touch screen is determined based on a value by which the identified quantity of abnormal points exceeds the quantity of abnormal points allowed in the pressing test. Thus the detect level of the touch screen can be determined automatically, instead of determined by a person, by the method of the present invention, such that a person can easily learn the compressive property and durability of the touch screen having defects, directly based on the defect level of the touch screen. Specifically, if the value by which the identified quantity of abnormal points exceeds the quantity of abnormal points allowed in the pressing test is relatively large, then the defect level of the touch screen is relatively high; if the value by which the identified quantity of abnormal points exceeds the quantity of abnormal points allowed in the pressing test is relatively small, then the defect level of the touch screen is relatively low.

In the above preferable embodiment, more preferably, when a warning is given after it is determined that the touch screen has defects, the detect level of the touch screen is notified to allow a person to conveniently learn the defect level of the touch screen.

In another preferable embodiment of the present implementation, in Step S2, a size of each abnormal point is identified in the acquired image, and the abnormal points are classified into multiple levels based on their sizes; in Step S3, a quantity of abnormal points of each level is compared with a quantity of abnormal points of the same level allowed in the pressing test, and it is determined that the touch screen has defects if a quantity of abnormal points of any level exceeds the quantity of abnormal points of the same level allowed in the pressing test. It can be understood that, when touch screens have the same identified quantities of abnormal points but different sizes thereof, abnormal points having different sizes impact on the display of the touch screens differently, and accordingly, the touch screens have different defect levels. In the present embodiment, when determining whether the touch screen has defects, in addition to the quantity of the identified abnormal points, the size of each abnormal point may be taken into consideration as well, so as to obtain a more accurate detection result.

In the above preferable embodiment, more preferably, in Step S3, the defect level of the touch screen is comprehensively determined based on respective values by which the quantity of abnormal points of each level exceeds the quantity of abnormal points of the same level allowed in the pressing test. Further, after determining that the touch screen has defects, a warning is given to alert a person; and when giving a warning after determining that the touch screen has defects, the defect level of the touch screen is notified.

In the present implementation, after each test point is tested, an image of the test region in which the test point is located is acquired, and abnormal points in the test region are detected, thereby allowing timely determination of whether the touch screen has defects. Moreover, when the touch screen is determined as having defects, the number of times the test point has been tested is obtained in time.

The method for detecting defects in a pressing test of a touch screen, provided in the present implementation, realizes automatic detection of whether the touch screen has defects in the pressing test by the steps of image acquisition, image identification, and abnormal point comparison, and, compared to the prior art, avoids detection errors occurring in visual detection as well as the inconsistency of detection criteria, thereby increasing the accuracy of the detection and preventing from false detection, missed detection and over detection. Meanwhile, in the present implementation, the detection can be performed automatically during the pressing test of the touch screen, which can improve the instantaneousness of the detection, and in addition, when it is determined in time that the touch screen has defects, the number of times the touch screen has been tested can be recorded, thereby making it possible to determine the compressive property and durability of the touch screen timely and conveniently.

Figure 2:
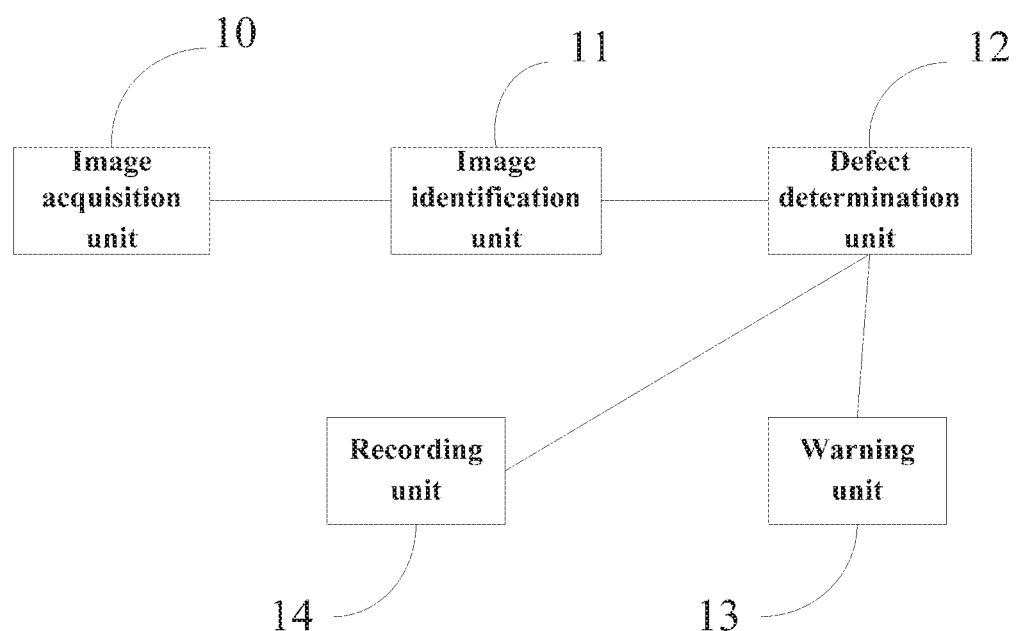
FIG. 2 is a schematic diagram of a device for detecting defects in a pressing test of a touch screen provided in an implementation of the present invention.

The present invention also provides an implementation of a device for detecting defects in a pressing test of a touch screen. The pressing test includes a clicking test, a scribing test, and a soft pressing test. FIG. 2 is a schematic diagram of the device for detecting defects in a pressing test of a touch screen provided in an implementation of the present invention. As shown in FIG. 2, in the present implementation, the device for detecting defects in a pressing test of a touch screen includes an image acquisition unit 10, an image identification unit 11 and a detect determination unit 12. The image acquisition unit 10 is used for acquiring, after each test point of the touch screen is tested, an image of a test region in which the test point is located, when performing the pressing test; the image identification unit 11 is used for identifying a quantity of abnormal points in the acquired image; and the defect determination unit 12 is used for comparing the identified quantity of abnormal points with a quantity of abnormal points allowed in the pressing test, and determining that the touch screen has defects if the identified quantity of abnormal points exceeds the quantity of abnormal points allowed in the pressing test.

Specifically, the image identification unit 11 compares the image acquired by the image acquisition unit 10 with a standard image, to identify the quantity of abnormal points in the image acquired by the image acquisition unit 10. Here, the standard image is an image of the test region in which the test point is located without any abnormal point. Because image comparison techniques belong to the prior art, a description thereof is omitted herein.

Preferably, when acquiring the image of the test region in which the test point is located, the image acquisition unit 10 indicates how many times the test point has been tested.

In the present implementation, an image of the test region, in which each test point is located, is acquired by the image acquisition unit 10, the image identification unit 11 identifies the quantity of abnormal points in the acquired image, and the defect determination unit 12 determines whether the identified quantity of abnormal points exceeds the quantity of abnormal points allowed in the pressing test, thereby allowing automatic detection of whether the touch scribe is qualified. Moreover, compared to the prior art, it avoids detection errors occurring in visual inspection as well as the inconsistency of detection criteria, thereby increasing the accuracy of the detection and preventing form false detection, missed detection and over detection. Meanwhile, in the present implementation, the detection is performed during the pressing test of the touch screen, so as to automatically determine whether the touch screen is qualified during the pressing test, which results in a better instantaneousness, and in addition, when it is determined that the touch screen has defects, the number of times the test point has been tested can be recorded in time, thereby making it possible to determine the compressive property and durability of the touch screen timely and conveniently.

Preferably, the defect determination unit 12 further determines a defect level of the touch screen based on a value by which the quantity of abnormal points identified by the image identification unit 11 exceeds the quantity of abnormal points allowed in the pressing test.

In the present implementation, preferably, the image identification unit 11 may also identify a size of each abnormal point in the acquired image, and classify the abnormal points into multiple levels based on the sizes of the abnormal points; and the defect determination unit 12 may also compare a quantity of abnormal points of each level with a quantity of abnormal points of the same level allowed in the pressing test, and determine that the touch screen has detects if a quantity of abnormal points of any level exceeds the quantity of abnormal points of the same level allowed in the pressing test. In this case, more preferably, the defect determination unit 12 may also determine comprehensively a defect level of the touch screen based on respective values by which the quantity of abnormal points of each level exceeds the quantity of abnormal points of the same level allowed in the pressing test.

Preferably, the device for detecting defects in a pressing test of a touch screen further includes a warning unit 13, which is used for giving a warning after the defect determination unit 12 determines that the touch screen has defects. Further, the warning unit 13 is also used for notifying the defect level of the touch screen when giving a warning after the defect determination unit 12 determines that the touch screen has defects.

Preferably, in the present implementation, the device for detecting defects in a pressing test of a touch screen further includes a recording unit 14, which is used for recording how many times the test point has been tested so far after the defect determination unit 12 determines that the touch screen has defects.

It can be understood that the foregoing implementations are merely exemplary implementations used for describing the principle of the present invention, but the present invention is not limited thereto. Those of ordinary skill in the art may make various variations and modifications without departing from the spirit and essence of the present invention, and these variations and modifications shall fall into the protection scope of the present invention.

What is claimed is:

1. A method for detecting defects in a pressing test of a touch screen, comprising:

Step S1: acquiring, after each test point of the touch screen is tested, an image of a test region in which the test point is located, when performing the pressing test;

Step S2: identifying a quantity of abnormal points in the acquired image; and

Step S3: comparing the identified quantity of abnormal points with a quantity of abnormal points allowed in the pressing test, and determining that the touch screen has defects if the identified quantity of abnormal points exceeds the quantity of abnormal points allowed in the pressing test, wherein Step S2 further comprises: identifying a size of each abnormal point in the acquired image, and classifying the abnormal points into multiple levels based on the sizes of the abnormal points; and Step S3 further comprises: comparing a quantity of abnormal points of each level with a quantity of abnormal points of the same level allowed in the pressing test, and determining that the touch screen has defects if a quantity of abnormal points of any level exceeds the quantity of abnormal points of the same level allowed in the pressing test.

2. The method for detecting defects in a pressing test of a touch screen according to claim 1, wherein Step S3 further comprises: comprehensively determining a defect level of the touch screen based on respective values by which the quantity of abnormal points of each level exceeds the quantity of abnormal points of the same level allowed in the pressing test.

3. The method for detecting defects in a pressing test of a touch screen according to claim 1, further comprising: after Step S3, giving a warning after determining that the touch screen has defects.

4. The method for detecting defects in a pressing test of a touch screen according to claim 2, further comprising: after Step S3, giving a warning after determining that the touch screen has defects, and notifying of the determined defect level of the touch screen.

5. The method for detecting defects in a pressing test of a touch screen according to claim 1, wherein Step S1 further comprises: indicating, when acquiring the image of the test region in which the test point is located, how many times the test point has been tested.

6. The method for detecting defects in a pressing test of a touch screen according to claim 1, wherein in Step S2, the quantity of abnormal points in the image acquired in Step S1 is identified by comparing the image acquired in Step S1 with a standard image, the standard image being an image of the test region in which the test point is located without any abnormal point.

7. The method for detecting defects in a pressing test of a touch screen according to claim 5, further comprising, after Step S3, recording, after determining that the touch screen has defects, how many times the test point has been tested.

8. A device for detecting defects in a pressing test of a touch screen, comprising:
   an image acquisition unit, for acquiring, after each test point of the touch screen is tested, an image of a test region in which the test point is located, when performing the pressing test;
   an image identification unit, for identifying a quantity of abnormal points in the acquired image; and
   a defect determination unit, for comparing the identified quantity of abnormal points with a quantity of abnormal points allowed in the pressing test, and determining that the touch screen has defects if the identified quantity of abnormal points exceeds the quantity of abnormal points allowed in the pressing test,
   wherein the image identification unit further identifies a size of each abnormal point in the acquired image, and classifies the abnormal points into multiple levels based on the sizes of the abnormal points; and
   the defect determination unit further compares a quantity of abnormal points of each level with a quantity of abnormal points of the same level allowed in the pressing test, and determines that the touch screen has defects if a quantity of abnormal points of any level exceeds the quantity of abnormal points of the same level allowed in the pressing test.

9. The device for detecting defects in a pressing test of a touch screen according to claim 8, wherein the defect determination unit further determines comprehensively a defect level of the touch screen based on respective values by which the quantity of abnormal points of each level exceeds the quantity of abnormal points of the same level allowed in the pressing test.

10. The device for detecting defects in a pressing test of a touch screen according to claim 8, further comprising a warning unit, for giving a warning after the defect determination unit determines that the touch screen has defects.

11. The device for detecting defects in a pressing test of a touch screen according to claim 9, further comprising a warning unit, which is used for giving a warning after the defect determination unit determines that the touch screen has defects, and notifying the determined defect level of the touch screen.

12. The device for detecting defects in a pressing test of a touch screen according to claim 8, wherein the image acquisition unit further indicates, when acquiring the image of the test region in which the test point is located, how many times the test point has been tested.

13. The device for detecting defects in a pressing test of a touch screen according to claim 8, wherein the image identification unit identifies the quantity of abnormal points in the image acquired by the image acquisition unit, by comparing the image acquired by the image acquisition unit with a standard image, the standard image being an image of the test region in which the test point is located without any abnormal point.

14. The device for detecting defects in a pressing test of a touch screen according to claim 12, further comprising a recording unit, which is used for recording, after the defect determination unit determines that the touch screen has defects, how many times the test point has been tested.

* * * * *